Oct. 19, 1965 E. S. TILLMAN, JR 3,212,275

THERMOELECTRIC HEAT PUMP

Filed Aug. 20, 1964

3 Sheets-Sheet 1

INVENTOR.
Edward S. Tillman Jr.
BY
Eli Weiss
ATTORNEY

Oct. 19, 1965 E. S. TILLMAN, JR 3,212,275

THERMOELECTRIC HEAT PUMP

Filed Aug. 20, 1964 3 Sheets-Sheet 2

INVENTOR.
Edward S. Tillman Jr.
BY
Eli Weiss
ATTORNEY

Oct. 19, 1965 E. S. TILLMAN, JR 3,212,275

THERMOELECTRIC HEAT PUMP

Filed Aug. 20, 1964

3 Sheets-Sheet 3

INVENTOR.
Edward S. Tillman Jr.

BY

Eli Weiss

ATTORNEY

United States Patent Office 3,212,275 Patented Oct. 19, 1965

3,212,275

THERMOELECTRIC HEAT PUMP

Edward S. Tillman, Jr., Basking Ridge, N.J., assignor to American Radiator & Standard Sanitary Corporation, New York, N.Y., a corporation of Delaware Filed Aug. 20, 1964, Ser. No. 390,882
9 Claims. (Cl. 62—3)

This invention pertains to thermoelectric heat pumps and more particularly to means for moving heat between an ambient region and a remote heat exchanger.

If a device removes heat from the air of an ambient region to a heat sink the device is generally known as an air cooler or air conditioner. If a device moves heat from a heat source to the air in an ambient region the device is generally known as a space heater. Either device can be termed as a heat pump.

Lately, there has been a renewed interest in thermoelectric devices as a means for moving heat. It has been known for a considerably long time that when an electric current flows through particular material and across junctions of the materials there is a flow of heat in the conductors which is superimposed on the usual ohmic effects. In particular, when certain classes of materials conduct electricity it is possible to pump heat "uphill" electronically to provide a refrigerator. These materials are said to exhibit the Peltier or Ettingshausen effects. The latter effect occurs when the material is subjected to a magnetic field while the former may be enhanced by a magnetic field. Although such effects have been long known and have existed as laboratory curiosities because of their extremely low efficiencies, advances in solid-state physics have produced certain crystalline solids-semiconductors which have sufficient efficiency to make electronic heat pumping economically feasible. In fact, in recent years there have become available thermoelectric refrigerators to provide spot cooling of electronic devices in missiles. However, such devices are merely used as localized refrigerators and not to replace conventional room air conditioners. In fact, their use has been so limited because there has not been available suitable thermoelectric modules which may be arrayed in sufficiently large configurations to provide adequate heat moving capacity to effect human environment conditions. In other words, units heretofore available could not efficiently be made large enough to operate as a room air conditioner.

It is accordingly, a general object of the invention to provide an improved heat pump capable of moving considerable quantities of heat.

It is another object of the invention to provide an improved thermoelectric heat pump which has sufficient capacity to change the climatic conditions of a humanly habitable room.

It is a further object of the invention to provide an improved thermoelectric heat pump which is compact and of modular form.

It is a still further object of the invention to provide an improved heat pump which except for minor quantities of semi-conductor materials utilizes simple and readily available materials.

Generally, the invention contemplates a thermoelectric heat pump which includes a hollow conduit of thermally conductive material adapted to carry a flowing fluid. On the outer wall of the conduit is electrically-insulatively fixed at least one P-type thermoelectric element and at least one N-type thermoelectric element. An electrically conductive thermal radiating means connects the N-type thermoelectric element to the P-type thermoelectric element to provide a thermoelectric junction therebetween.

Other aspects of the invention are concerned with modularizing the heat pump and arraying the same to provide an air conditioner.

Other objects, and the features and advantages of the invention will be apparent from the following detailed description when read with the accompanying drawings which show by way of example and not limitation, various embodiments of the invention.

Figures 1, 2:
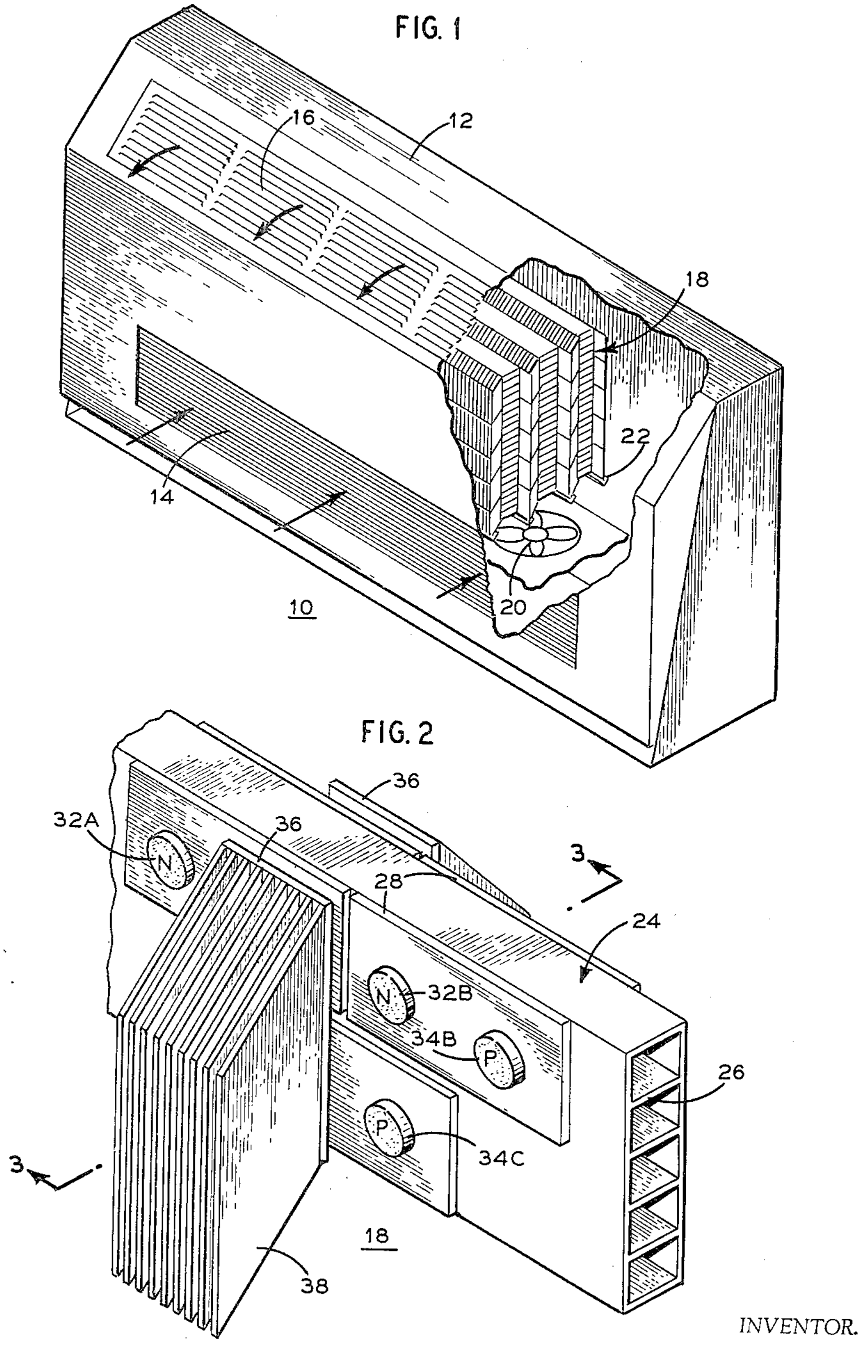
FIGURE 1 is a perspective view of an air conditioner with a portion of its housing broken away to show the modularized thermoelectric pumps which pump heat from circulating air to a coolant fluid.
FIGURE 2 is a perspective view of one of the modular thermoelectric pumps of FIGURE 1.

Referring now to FIGURE 1 there is shown an air conditioner 10 which includes a housing 12 having an air inlet 14 and an air outlet 16. Fixed within the housing 12 are a plurality of finned thermoelectric modules 18 which can extract heat from the ambient air. By way of example, the modules are in an array of three modules wide and five high. Disposed below the thermoelectric modules 18 are fans 20 for forcing air past the fins of the modules 18. In operation, air enters air inlet 14, is forced by fans 20 past the fins where it is cooled and leaves from air outlet 16. By virtue of the cooling of the air, the moisture contained therein collects on the fins and drips into troughs 22.

Figure 3:
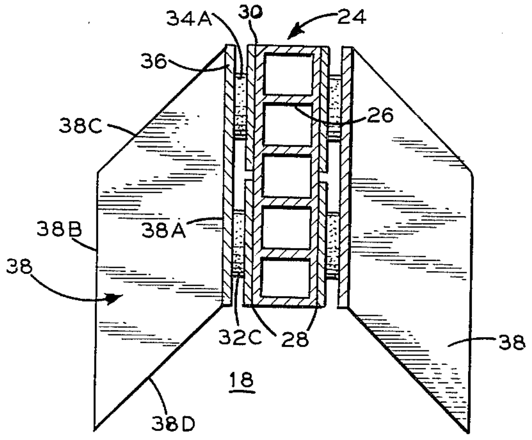
FIGURE 3 is a cross-sectional view taken along the line 3—3 of FIGURE 2.

The details of the finned thermoelectric module 18 are shown in FIGURES 2 and 3. In particular, module 18 comprises a rectangular conduit 24 made of a good thermally conductive material such as brass. Conduit 24 is adapted to carry fluid. Furthermore, conduit 24 performs the added function of being the main structural member or "backbone" for the module. Therefore, only simple end plates are required to mount the module. Integral with the inner wall portions of conduit 24 are thermally conductive cross webs 26 which provide both mechanical rigidity for conduit 24 and an increased heat exchange interface. Secured to the outside of both side walls are longitudinally or horizontally extending electrically and thermally conductive elements or junction strips 28. Strips 28 are secured to both side walls to optimize the use of the available heat transfer surface and negate any bowing of conduit 24 due to thermal expansion. If strips 28 were placed on only one side wall there is the possibility of warping conduit 24. It should be noted that junction strips 28 are electrically insulated from each other and from conduit 24. However, junction strips 28 must be thermally conductive with the side walls of conduit 24. Accordingly, a thin layer of epoxy glue or the like can provide the joint 30 between junction strips 28 and conduit 24. Thermally and electrically conductively secured to each junction strip 28 is an N-type thermoelectric element 32 and a P-type thermoelectric element 34.

An N-type thermoelectric element may be a pellet of a semi-conductor material such as bismuth telluride with a minute amount of impurities such as cuprous iodide which insures that there are an excess of electrons in the semiconductor. On the other hand, a P-type may be a pellet of a semiconductor material such as bismuth telluride with a minute amount of impurities such as free bismuth which insures that there are an excess of "holes" in the semiconductor.

Conductively secured to each vertically displaced pair of thermoelectric elements is a conductive element or base plate 36 of a thermally and electrically conductive material. On each base plate 36 there is thermally conductively affixed a plurality of vertically and laterally extending fins 38. It should be noted in FIGURE 2 that many of the base plates such as the base plate connecting thermoelectric elements 32B and 34C and fins have not been shown for the sake of clarity. Similarly, not all of the junction strips 28 and thermoelectric elements 32 and 34 of the module are shown.

Fins 38 are basically thin plates of metal having a first side edge 38A fixed to base plate 36, a second side edge 38B, a top edge 38C and a bottom edge 38D. Top edge 38C and bottom edge 38D form a downwardly directed angle with the horizontal in the direction from side edge 38A to side edge 38B. The top and bottom edges 38C and 38D are so defined in order that moisture condensed from the air collecting on the fins runs along the bottom edges thereof and will drop off when enough water is collected to overcome the surface tension force. Downwardly angled top and bottom edges are more efficient than upwardly extending top and bottom edges. With downwardly angled edges moisture collects at the tip of the fin, i.e. in the region where side edge 38B and bottom edge 38D intersect; with upwardly angled edges moisture collects at the base of the fin, i.e. the region where side edge 38B and bottom edge 38D intersect. It is well known that with a plate type fin of constant thickness the base region is a more effective heat transfer area than the tip region. Thus, if upwardly extending edges are used the condensed moisture collects in a region where it blocks air flow over the most effective radiating surface.

Modules 18 can be made in any convenient length and stacked in various arrays in addition to the array shown in FIGURE 1 to form layer cooling units. With the array shown in FIGURE 1, condensed moisture drips from the tips of the fins of the upper modules onto the tips of the fins of the lower modules and eventually into drip troughs 22. It should be noted that the modules 18 must be positioned so that the fins of different modules do not touch since the modules are at different electrical potential during operation.

Figure 6:
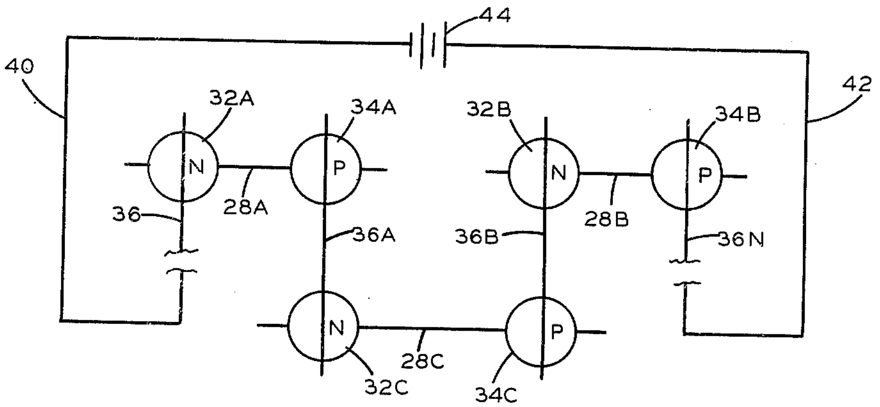
FIGURE 6 is an electrical schematic for a thermoelectric module of FIGURE 2.

The electrical circuit for the thermoelectric elements is shown in FIGURE 6 wherein only a representative number of the elements are shown; the breaks in conductors 40 and 42 imply that there are similar configurations of the elements which are not shown.

A source of D.C. potential 44 has its negative terminal connected to line 40 and its positive terminal to line 42. The top of N-type thermoelectric element 32A receives the negative potential from line 40 via elements not shown. The bottom of N-type thermoelectric element 32A is connected via junction strip 28A to the bottom of P-type thermoelectric element 34A. Junction strip 28A cooperating with the bottoms of thermoelectric elements 32A and 34A can be considered as an NP or hot junction. Base plate 36A connects the top of P-type thermoelectric element 34A to the top of N-type thermoelectric element 32C. Base plate 36A cooperating with the tops of thermoelectric elements 34A and 32C can be considered as a PN or cold junction. Since the remainder of the circuitry is merely a serial iteration of alternate hot and cold junctions it will not be described.

When a current flows in an N-type thermoelectric element, the negative electrons carry both kinetic and potential energy from the face of the material at the more positive potential. Therefore, in FIGURE 6 taking into account the polarity of source 44 electrons are moved from the top to the bottom of the N-type thermoelectric elements 32. In a P-type thermoelectric element the positive holes carry kinetic and potential energy from the face having the more positive potential to the face having the more negative potential. Therefore, in FIGURE 6 holes are moved from the top to the bottom of the P-type thermoelectric elements 34.

When an N-type thermoelectric element 32 is electrically connected to a P-type thermoelectric element 34 to form a junction, a thermoelectric device is obtained. If the current flows through the device so that electrons in the N-type element and holes in the P-type element move toward the junction a hot junction is obtained. Since this is the case for the junction formed by junction strips 28 cooperating with the bottoms of the thermoelectric elements 32 and 34, strips 28 are affixed to a heat sink in the form of conduit 24 (FIGURE 1). However, it should be realized that while the above described electron and hole flow is toward the bottoms of the thermoelectric elements the flow is from the tops of the thermoelectric elements. Therefore, the junctions formed by the base plates 36 become cold. The net effect is that heat is pumped from base plates 36 to junction strips 28 and since base plates 36 are thermally connected to fins 38 (FIGURE 2) and junction strips 28 are thermally connected to conduit 24 heat is pumped from the air surrounding fins 38 to the fluid in conduit 24. Of course, it should be apparent that if the polarity of potential source 44 is reversed, electron and hole flow in the thermoelectric elements reverses and heat will be pumped from the fluid in conduit 24 to the air about fins 38.

Figure 4:
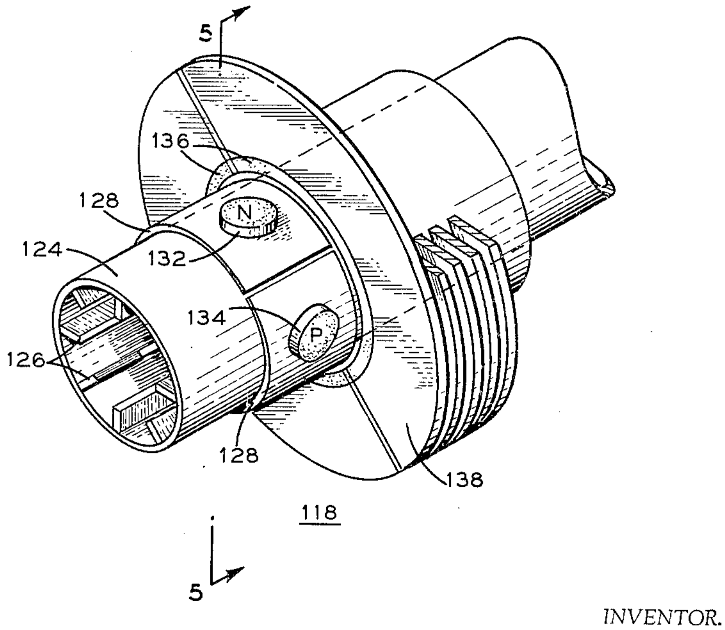
FIGURE 4 is a perspective view of an alternate embodiment of the thermoelectric pump module of FIGURE 1.
Figure 5:
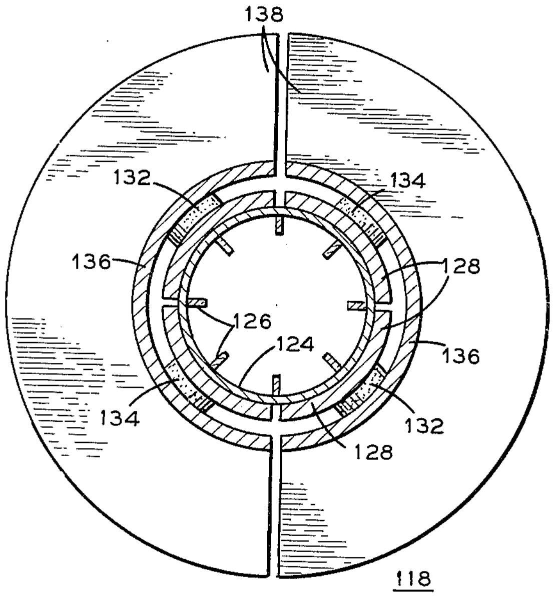
FIGURE 5 is a cross-sectional view of the thermoelectric pump module of FIGURE 4.

FIGURES 4 and 5 show an alternate embodiment of the thermoelectric module. Module 118 comprised a circular conduit 124 for carrying a fluid. Extending radially inward from the inner wall of conduit 124 are fins 126 to enhance heat flow between conduit 124 and the coolant. Axially fixed along the outer surface of conduit 124 are a plurality of conductive elements or junction strips 128. The junction strips 128 are of conductive material and are thermally connected but electrically insulated from conduit 124 by means of an epoxy glue or the like. Junction strips 128 are insulated from each other. Thermally and electrically connected to each junction strip 28 is one N-type thermoelectric element 132 and one P-type thermoelectric element 134. The elements may be ground or cast to have the appropriate surface curvature. Conductively connected to each angularly displaced N-type element and P-type element pair is a conductive element or base plate 136. Radially extending from each base plate 136 are a plurality of metal fins 138. Since the electrical connections and operation of module 118 are similar to module 18 of FIGURES 2 and 3, a description thereof will not be given.

There has thus been shown an improved thermoelectric pump which can be incorporated in a thermoelectric module which by virtue of its simplified construction can be arrayed to provide an air conditioner.

While only two embodiments of the invention are shown and described in detail, there will now be obvious to those skilled in the art many modifications and variations which satisfy the objects and to which accrue the advantages of the invention. However, these modifications and variations will not depart from the spirit of the invention as defined by the appended claims.

What is claimed is:

1. A thermoelectric heat pump comprising a hollow conduit of thermally conductive material for carrying a flowing fluid, said hollow conduit including an outer wall portion, first, second and third electrically and thermally conductive elements electrically-insulatively fixed to said outer wall portion, each of said conductive elements electrically insulated from each other, a first N-type thermoelectric element conductively connected to said first conductive element, a first P-type thermoelectric element conductively connected to said second conductive element, a second N-type thermoelectric element conductively connected to said third conductive element, a second P-type thermoelectric element conductively connected to said third conductive element, a fourth electrically and thermally conductive element connected to said first N-type thermoelectric element and said second P-type thermoelectric element, and a fifth electrically and thermally conductive element connected to said second N-type thermoelectric element.

2. A thermoelectric heat pump comprising a hollow conduit of thermally conductive material for carrying a flowing fluid, said hollow conduit including an outer wall portion, first, second and third electrically and thermally conductive elements electrically-insulatively fixed to said outer wall portion, each of said conductive elements electrically insulated from each other, a first N-type thermoelectric element conductively connected to said first conductive element, a first P-type thermoelectric element conductively connected to said second conductive element, a second N-type thermoelectric element conductively connected to said third conductive element, a second P-type thermoelectric element conductively connected to said third conductive element, a fourth electrically and thermally conductive element connected to said first N-type thermoelectric element and said second P-type thermoelectric element, and a fifth electrically and thermally conductive element connected to said second N-type thermoelectric element and said first P-type thermoelectric element and a plurality of thermally conductive fins fixed to and extending from said fourth and fifth conductive elements.

3. A thermoelectric heat pump comprising a hollow conduit of thermally conductive material for carrying a flowing fluid, said hollow conduit including an outer wall portion, first, second and third electrically and thermally conductive elements electrically-insulatively fixed to said outer wall portion, each of said conductive elements electrically insulated from each other, a first N-type thermoelectric element conductively connected to said first conductive element, a first P-type thermoelectric element conductively connected to said second conductive element, a second N-type thermoelectric element conductively connected to said third conductive element, a second P-type thermoelectric element conductively connected to said third conductive element, a fourth electrically and thermally conductive element connected to said first N-type thermoelectric element and said second P-type thermoelectric element, and a fifth electrically and thermally conductive element connected to said second N-type thermoelectric element and said first P-type thermoelectric element and a plurality of thermally conductive fins fixed to and extending from said fourth and fifth conductive elements, each of said fins comprising a vertically disposed lamina including top, bottom and first and second side edge portions wherein said first side edge portions are connected to said conductive elements, and said top and bottom edge portions extend downwardly from the horizontal in the direction from said first side edge portions to said second side edge portions.

4. A thermoelectric heat pump comprising a hollow conduit of thermally conductive material for carrying a flowing fluid, said hollow conduit including an outer wall portion and an inner wall portion, a plurality of heat transferring fin means fixed to said inner wall portion, first, second and third electrically and thermally conductive elements electrically-insulatively fixed to said outer wall portion, each of said conductive elements electrically insulated from each other, a first N-type thermoelectric element, a first P-type thermoelectric element conductively connected to said second conductive element, a second N-type thermoelectric element conductively connected to said third conductive element, a second P-type thermoelectric element conductively connected to said third conductive element, a fourth electrically and thermally conductive element connected to said first N-type thermoelectric element and said second P-type thermoelectric element, and a fifth electrically and thermally conductive element connected to said second N-type thermoelectric element and said first P-type thermoelectric element.

5. A thermoelectric heat pump comprising a hollow rectangular cross-sectioned conduit of thermally conductive material adapted to carry a flowing fluid, said hollow conductor including a pair of side walls, a top wall and a bottom wall, first, second and third electrically and thermally conductive elements electrically-insulatively fixed to the outer portion of one of said side walls, fourth, fifth and sixth conductive elements electrically-insulatively fixed to the outer portion of the other of said side walls, each of said conductive elements electrically insulated from each other, a first N-type thermoelectric element conductively connected to said first conductive element, a first P-type thermoelectric element conductively connected to said second conductive element, a second P-type thermoelectric element conductively connected to said third conductive element, a second N-type thermoelectric element conductively connected to said third conductive element, a third N-type thermoelectric element conductively connected to said fourth conductive element, a third P-type thermoelectric element conductively connected to said fifth conductive element, a fourth N-type thermoelectric element conductively connected to said sixth conductive element, a fourth P-type thermoelectric element conductively connected to said sixth conductive element, a first electrically and thermally conductive radiating means conductively connecting said first N-type thermoelectric element to said second P-type thermoelectric element, a second electrically and thermally conductive radiating means conductively connecting said first P-type thermoelectric element to said second N-type thermoelectric element, a third electrically and thermally conductive radiating means conductively connecting said third N-type thermoelectric element to said fourth P-type thermoelectric element, and a fourth electrically and thermally conductive radiating means conductively connecting said third P-type thermoelectric element to said fourth N-type thermoelectric element.

6. The thermoelectric heat pump of claim 5 including a thermally conductive cross web means extending between the side walls within said conduit.

7. The thermoelectric heat pump of claim 5 wherein each of said radiating means includes a plurality of laminar fins.

8. The thermoelectric heat pump of claim 14 wherein each of said radiating means includes a platelike conductor and a plurality of vertically disposed laminae, each of said laminae including top, bottom and first and second side edge portions, the first side edge portions of said laminae being fixed to and laterally extending from the associated platelike conductor.

9. The thermoelectric heat pump of claim 8 wherein said top and bottom edge portions of said laminae extend downward from the horizontal in the direction from said first edge portions to said second edge portions.

References Cited by the Examiner

UNITED STATES PATENTS

| | | | |
|---|---|---|---|
| 2,467,668 | 4/49 | Hallbery | 165—179 |
| 2,943,452 | 5/60 | Buchanan | 62—3 |
| 2,949,014 | 8/60 | Belton | 62—3 |
| 2,959,925 | 11/60 | Frantti | 62—3 |
| 3,040,538 | 6/62 | Alsing | 62—3 |
| 3,054,840 | 8/62 | Alsing | 62—3 |
| 3,073,127 | 1/63 | Schmerzler | 62—3 |
| 3,077,080 | 2/63 | Pietsch | 62—3 |
| 3,091,289 | 5/63 | Weinstein | 165—182 |
| 3,111,813 | 11/63 | Blumentritt | 62—3 |
| 3,167,926 | 2/65 | Wepfer | 62—3 |

WILLIAM J. WYE, *Primary Examiner.*